United States Patent
Davila, Jr.

(10) Patent No.: US 8,806,697 B1
(45) Date of Patent: Aug. 19, 2014

(54) MACHINE FOR CLEANING THE INTERIOR OF A WATER STORAGE TANK

(76) Inventor: Gilberto Davila, Jr., Lehigh Acres, FL (US)

( * ) Notice: Subject to any disclaimer, the term of this patent is extended or adjusted under 35 U.S.C. 154(b) by 84 days.

(21) Appl. No.: 13/136,602

(22) Filed: Aug. 5, 2011

Related U.S. Application Data

(60) Provisional application No. 61/401,325, filed on Aug. 11, 2010.

(51) Int. Cl.
 *B08B 9/087* (2006.01)
 *E03B 11/00* (2006.01)

(52) U.S. Cl.
 USPC ........................................................ 15/246.5

(58) Field of Classification Search
 CPC ........ B08B 9/087; B08B 9/08; B08B 9/0808; E03B 11/00
 USPC ............ 15/246.5, 183, 202, 104.096, 104.09, 15/104.095
 IPC .......................... B08B 9/08, 9/087; E03B 11/00
 See application file for complete search history.

(56) References Cited

U.S. PATENT DOCUMENTS

| | | | | |
|---|---|---|---|---|
| 728,714 A * | 5/1903 | Hogg | ............................ | 137/242 |
| 864,664 A * | 8/1907 | Mild | ......................... | 15/104.13 |
| 1,785,024 A * | 12/1930 | Evans | ........................... | 15/246.5 |
| 1,876,334 A * | 9/1932 | McAnear | ..................... | 15/246.5 |
| 2,228,421 A * | 1/1941 | Taylor | ........................... | 222/228 |
| 2,542,709 A * | 2/1951 | Rowland | ..................... | 15/176.5 |
| 2,554,546 A * | 5/1951 | Zahm | ........................... | 15/246.5 |
| 2,556,389 A * | 6/1951 | Darrah | ............................. | 15/72 |
| 2,746,535 A * | 5/1956 | Barroso | ......................... | 159/1.1 |
| 2,884,234 A * | 4/1959 | Franklin et al. | ............... | 366/314 |
| 3,200,430 A * | 8/1965 | Haracz | ............................ | 15/183 |
| 3,225,817 A * | 12/1965 | Thier | ............................. | 159/6.2 |
| 3,349,423 A * | 10/1967 | Lousberg | ........................ | 15/183 |
| 3,428,106 A * | 2/1969 | Johnston | ........................ | 159/6.2 |
| 3,496,860 A * | 2/1970 | Andersson | ...................... | 99/483 |
| 3,679,477 A * | 7/1972 | Zimmer | ............................ | 134/8 |
| 4,095,307 A * | 6/1978 | Brubaker | ..................... | 15/246.5 |
| 4,830,748 A * | 5/1989 | Hall | ............................. | 210/241 |
| 5,378,051 A * | 1/1995 | Kirkkala et al. | ................ | 300/21 |
| 5,933,907 A * | 8/1999 | Drumm | ........................... | 15/183 |
| 7,543,354 B2 * | 6/2009 | Lee et al. | ........................ | 15/302 |

(Continued)

FOREIGN PATENT DOCUMENTS

| | | | |
|---|---|---|---|
| EP | 1236521 B8 * | 2/2006 | |
| JP | 2001038317 A * | 2/2001 | ............. B08B 9/087 |
| KR | 20070080280 * | 8/2007 | |

OTHER PUBLICATIONS

Machine Translation of JP 2001-038317 A1 in English.*

(Continued)

*Primary Examiner* — Joseph J Hail
*Assistant Examiner* — Marc Carlson
(74) *Attorney, Agent, or Firm* — William E. Noonan

(57) ABSTRACT

A machine for automatically cleaning the interior surface of a water storage tank includes a motor for mounting on a cover of the tank. A drive shaft is operably connected to the motor and extends through a channel in the cover of the tank. A scrubbing assembly is connected to the drive shaft. The motor operates the drive shaft to turn the scrubbing assembly within the tank such that brushes of the scrubbing assembly engage and clean the interior surfaces of the tank.

18 Claims, 4 Drawing Sheets

(56) References Cited

U.S. PATENT DOCUMENTS

| | | |
|---|---|---|
| 8,397,334 B2 * | 3/2013 | Ryffel .................. 15/56 |
| 2003/0115702 A1 * | 6/2003 | Edwards ................ 15/159.1 |
| 2007/0000558 A1 * | 1/2007 | Burris et al. ............ 141/65 |
| 2011/0214701 A1 * | 9/2011 | Chi .................... 134/167 R |

OTHER PUBLICATIONS

Rowland Co.—Lovejoy Catalog—Double Universal Joint, 2002.*

* cited by examiner

MACHINE FOR CLEANING THE INTERIOR OF A WATER STORAGE TANK

RELATED APPLICATION

This application claims the benefit of U.S. Provisional Patent Application Ser. No. 61/401,325 filed Aug. 11, 2010.

FIELD OF THE INVENTION

This invention relates to a machine for automatically cleaning the interior surfaces of a water storage tank or irrigation unit.

BACKGROUND OF THE INVENTION

Water storage or holding tanks are commonly used by residences and businesses that are not connected to a municipal water supply. The tank receives water pumped from an underground well and stores that water until it is needed by the user. Periodically, the interior walls of the tank must be cleaned of dirt and debris. Traditionally, such cleaning is performed manually. The tank is first drained completely. The inside floor and walls are then brushed or scrubbed by either the owner of the tank or a service person hired by the owner. After the tank is thoroughly cleaned, it must then be at least partially refilled with water.

The foregoing procedure is labor intensive, time consuming, tedious, and often expensive. Moreover, water from the tank is unavailable while this maintenance is being performed. Hiring a qualified service company to perform regular cleanings can be especially costly. On the other hand, if regular periodic cleanings are neglected, water quality can suffer and filters, pipes and pumps associated with the water supply can become contaminated and/or clogged. This, in turn, can necessitate unwanted maintenance expense.

SUMMARY OF THE INVENTION

It is therefore an object of the present invention to provide a machine for automatically cleaning the interior surface of a water storage tank in a quick, convenient and effective manner.

It is a further object of this invention to provide a motorized water tank cleaner that eliminates the time, physical effort and expense normally associated with manual cleaning of the tank.

It is a further object of this invention to provide a water tank cleaner that performs periodic maintenance of a water tank at regular intervals and without the need to manually scrub the interior of the tank or hire an expensive cleaning service to perform such maintenance.

It is a further object of this invention to provide a water storage tank cleaner that effectively removes dirt, debris and algae from the interior surfaces of a water storage tank so that water quality is improved and far less problems are encountered when pumping and filtering the water supplied from the tank.

It is a further object of this invention to provide a water storage tank cleaner that may be used effectively in various types of water storage, irrigation and holding tanks.

It is a further object of this invention to provide a water storage tank cleaning machine that remains permanently mounted to the water storage tank and which operates automatically, as needed, to effectively clean the interior surfaces of the tank.

This invention features a machine for automatically cleaning the interior surfaces of a generally cylindrical water storage tank assembly. The machine includes a motor for mounting on a removable lid of the storage tank. A drive shaft is axially rotatably interconnected to the motor for extending through a vertical opening in the lid of the tank. A lower end of the drive shaft is attached to a scrubbing assembly. The scrubbing assembly includes at least one elongate retention arm that carries a flexible scrubbing component. Operation of the motor axially rotates the drive shaft. The drive shaft turns the scrubbing assembly through the interior of the tank such that the flexible scrubbing component engages and cleans the interior surfaces of the tank.

In a preferred embodiment, the scrubbing assembly includes a lower turning shaft that is operably interconnected to the drive shaft such that when the drive shaft is axially rotated by the motor, the lower turning shaft turns through the interior of the tank. The turning shaft may be operably connected to the drive shaft by an off-center shaft connector or by a pair of interengaging gears axially attached to the drive shaft and the turning shaft respectively. The scrubbing assembly may include a horizontal retention arm connected proximate a lower end of the turning shaft and a vertical retention arm attached proximate a distal end of the horizontal retention arm and extending vertically upwardly therefrom. The flexible scrubbing component may include a first portion attached to and depending from the horizontal retention arm for engaging a bottom of the tank. The flexible scrubbing component may also include a second portion carried by the vertical retention arm for extending laterally outwardly from the arm and engaging an interior side surface of the tank. Each portion of the flexible scrubbing component may include a brush. The brushes may be carried in grooved tracks formed respectively in the horizontal and vertical retention arms of the scrubbing assembly.

The scrubbing assembly may alternatively include a horizontal support rod that is attached to a lower end of the drive shaft and extends radially outwardly therefrom. A vertical scrubbing element retention arm may be attached proximate a distal end of the horizontal support rod and extend vertically downwardly therefrom through the tank. A horizontal cleaning element retention arm may be secured proximate a lower end of the vertical cleaning element retention arm and extend inwardly therefrom. The vertical and horizontal retention arms may carry brushes or other types of flexible cleaning elements that are secured in respective tracks in the vertical and horizontal retention arms. These brushes or other scrubbing components engage the side and bottom surfaces of the tank interior. In this version the motor operates to axially rotate the drive shaft. This turns the support rod within the tank such that the brushes or other types of cleaning elements engage the interior sides and bottom of the tank to clean the tank of debris.

The motor may be secured to the drive shaft through a coupling. The motor may feature various speeds and horsepowers and may be operated in either a single direction or a reciprocating (back and forth) manner. A timing mechanism may be utilized to operate the motor and therefore clean the interior of the tank at preprogrammed times and at regular periodic intervals.

DETAILED DESCRIPTION OF PREFERRED EMBODIMENTS

Other objects, features and advantages will occur from the following description of a preferred embodiment and the accompanying drawings, in which.

Figure 1:
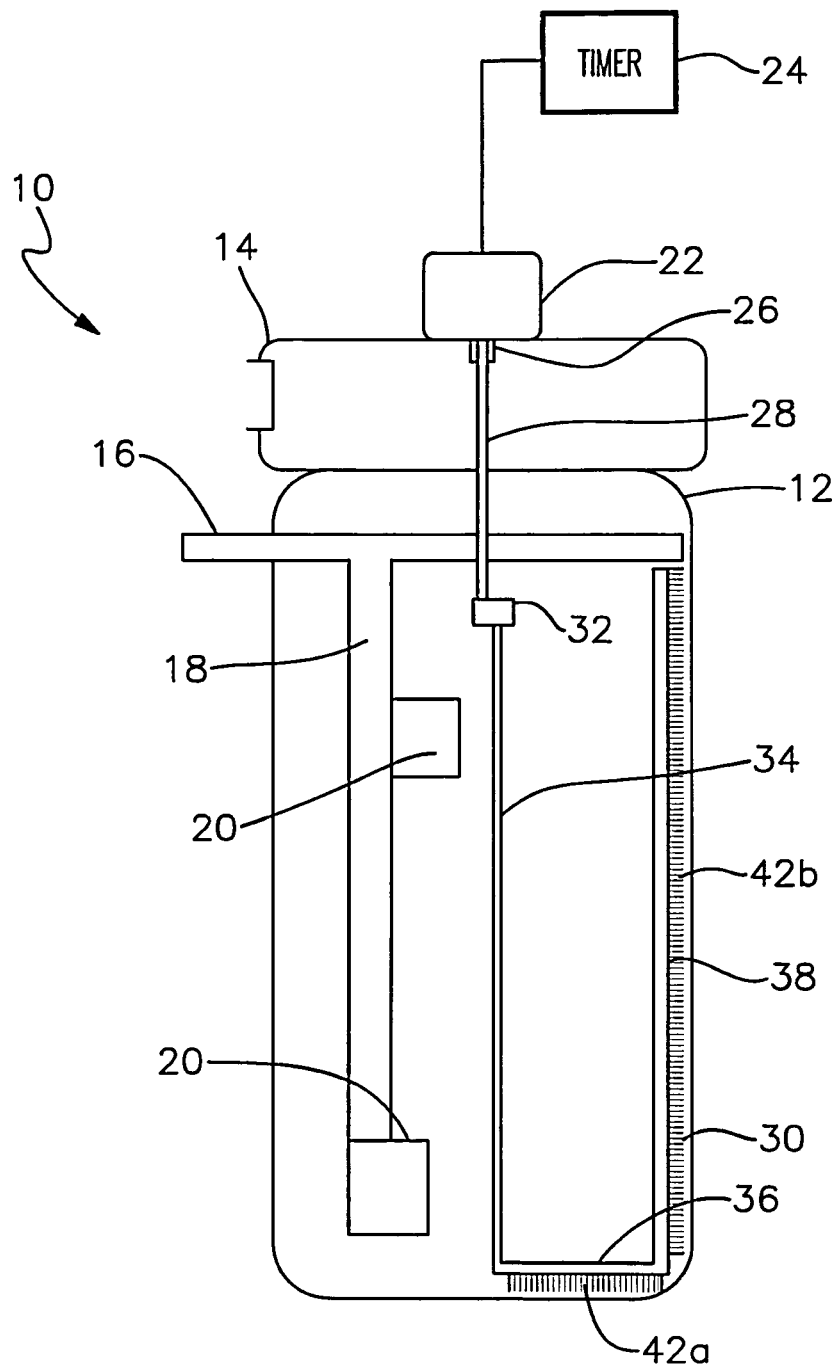
FIG. 1 is a side, elevational view of a preferred machine for automatically cleaning a water storage tank in accordance with this invention.

There is shown in FIG. 1, a motorized tank cleaning apparatus 10 for automatically cleaning a water storage or holding tank 12. It should be understood that tank 12 is typically the conventional type of water storage or holding tank utilized in a residential or business water supply system or irrigation unit wherein water is pumped from a well (not shown) into tank 12. A separate pump then delivers water from the storage tank 12 to the user as needed. The particular details of the water supply and delivery system do not comprise features of this invention and will be known to persons skilled in the art. It should be understood that the tank cleaning machine disclosed herein is not limited to use with any particular type of water storage or holding tank. The cleaning machine may be utilized for virtually any and all types and sizes of such tanks having interior surfaces that require periodic cleaning.

In the version depicted herein, tank 12 has a generally cylindrical, cross sectional side wall with a diameter of approximately 2 feet and a height or approximately 56-60 inches. A cover or lid 14 is removably mounted over a standard upper opening of the tank to provide selected access to the interior of tank 12. The tank and cover may be composed of various known materials, e.g. plastics. In a particularly common variety of storage tank, a first PVC conduit 16 is mounted in a conventional manner such that it extends centrally through the tank and proximate an upper end thereof. A second PVC pipe 18 extends vertically downwardly from conduit 16 through the tank. Horizontal and vertical conduits are formed conventionally in water storage tanks to perform various standard functions such as introducing water or wiring electrical wiring and cables into the tank in a known manner. The specific function of respective conduits 16, 18 is not a limitation of this invention. However, it is critical that conduits be disposed within the tank as described and claimed herein. Conventional floats 20 are operably connected to standard electrical wiring and cables that extend, for example, through conduits 16 and 18. The floats are mounted in a known manner within the tank to operate respective float switches (not shown) for controlling operation of the pump (not shown) that delivers water from the well to tank 12.

Cleaning machine 10 includes an electric motor 22 that is permanently mounted on cover or lid 14. Motor 22 may be attached to the cover by appropriate types of brackets or other fasteners and may be installed in a preformed recess in the upper surface of the cover. A preferred electric motor 22 may comprise a parallel shaft synchronous AC gear motor with a speed of 2-4 RPMs and a torque of 10-15 inch lbs. The motor may feature a reversible or reciprocating operation and may exhibit a voltage and frequency of 115V and 60 Hz respectively. Alternative motor specifications may be utilized according to the size and requirements of the particular tank to be cleaned. Periodic operation of the motor may be controlled by an optional timer 24 in the manner described more fully below.

Motor 22 is connected through a coupling 26 to a drive shaft 28, which in turn, extends through a vertical channel formed through tank cover 14. As further shown in FIG. 2, driveshaft 28 is offset slightly (i.e. by approximately 1") from the center of cover 14 so that vertical shaft 28 is clear of and does not interfere with centrally mounted PVC conduit 16. The vertical channel accommodating shaft 28 is positioned in an off-center manner through cover 14 to provide such clearance.

Figure 2:
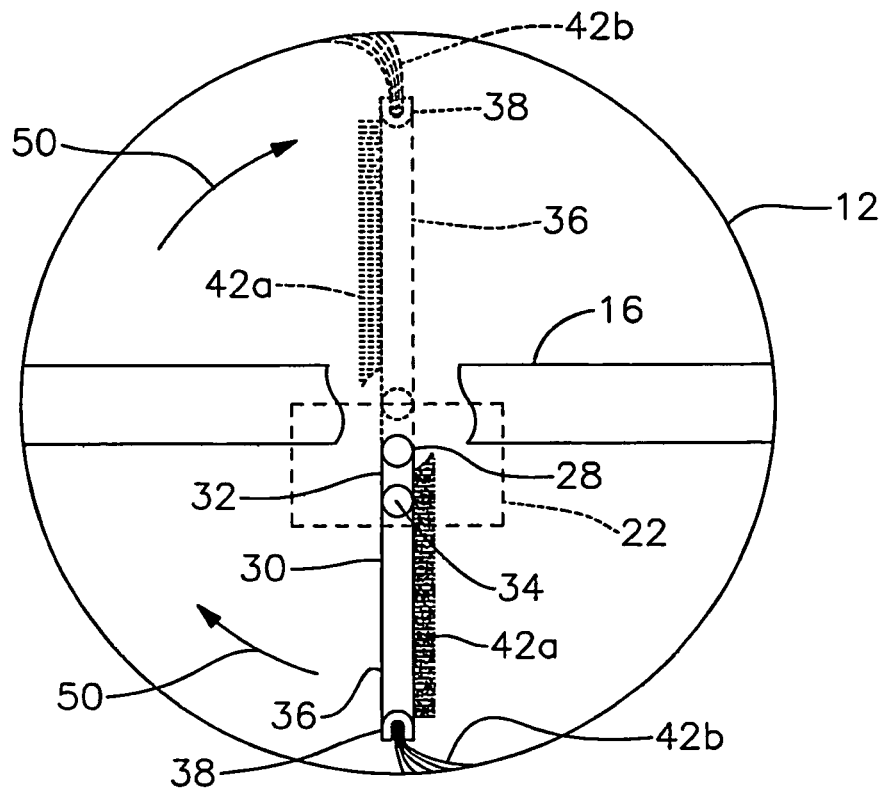
FIG. 2 is a top view of the water tank with a portion of the PVC water line cut away to depict operation of the tank cleaning machine.

A cleaning or scrubbing brush assembly 30, FIGS. 1 and 2, is operably connected to drive shaft 28 through a 1" off-centered shaft connector 32. More particularly, brush assembly 30 includes a lower, brush turning shaft 34 that is secured to shaft connector 32 and extends vertically downwardly through the tank to a lower end proximate the bottom of the tank. Shaft 34 may be constructed of various high strength and durable materials such as metals, metal alloys and rugged plastics.

Figure 2A:
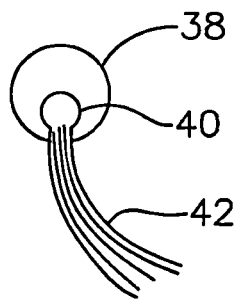
FIG. 2A is a cross sectional view of a representative brush as secured in the brush retention arm.

A horizontal brush retention arm 36 is joined to a lower end of shaft 34 and extends horizontally outwardly therefrom. A vertical brush retention arm 38 is similarly secured to an outer distal end of horizontal arm 36 and extends vertically upwardly therefrom as best shown in FIG. 1. As represented by retention arm 38 in FIG. 2A, each of arms 36 and 38 includes a longitudinal track 40 for securing a respective brush segment 42 to the arm. As shown more particularly in FIG. 1, a horizontal brush segment 42a held by horizontal retention arm 36 engages a bottom interior surface of tank 12. By the same token, vertical retention arm 38 holds a vertical brush segment 42b, which engages the inner surface of the cylindrical side wall of tank 12. The brush segments may be composed of various types of durable and high performance bristles. In alternative embodiments, other types of flexible cleaning/scrubbing elements (i.e. sponges, squeegees, etc. may be employed within the scope of this invention).

Cleaning machine 10 operates automatically to scrub and clean the interior surfaces of water storage tank 12. Motor 22 is activated either through operation of a standard manual switch or through a timer 24. The motor axially rotates drive shaft 28 through coupling 26 in either a one-way or an alternating/reciprocating manner. As drive shaft 28 rotates, the shaft turns shaft connector 32 and attached brush turning shaft 34 in the direction of arrows 50, FIG. 2. Shaft 34 thereby revolves about drive shaft 28 within the interior of the tank. This in turn drives the horizontal retention arm 36 and vertical retention arm 38 through the tank, for example from the position shown in FIG. 2 (generally at the 6:00 position) to the 12:00 position indicated in phantom in FIG. 2. As the scrubbing brush assembly 30 is turned in this manner within the tank, the brush segments 42a and 42b engage and clean the bottom and sides of tank 12 respectively. As scrubbing/cleaning assembly 30 is rotated within the tank, flexible brush segment 42a engages and scrubs the bottom of the tank whereas flexible brush segment 42b engages and scrubs the sides of the tank. In situations where a reciprocating motor is used, the direction of the drive shaft and the attached scrubbing assembly periodically reverse and the flexible brushes are pulled in the opposite direction. The motor may be operated for any duration and in any pattern or sequence required to achieve a clean tank interior. It should be noted that because turning shaft 34 revolves about off-center drive shaft 28, a greater surface area of brush segment 42(b) engages the inner side surface of the tank during portions of the cycle when the shaft 34 is positioned closer to the inside wall of the tank. For this reason, the bristles of brush segment 42(b) should be long enough to engage and clean the interior side walls of the tank at all points in the cycle, i.e. such as that shown in the diametrically opposed positions in FIG. 2.

The brush retention arms may be composed of strong and durable materials analogous to those composing the turning shaft. It is particularly preferred that the turning shaft and the horizontal and vertical retention arms be unitarily molded or otherwise integrally connected to provide a rugged and long-lasting operation.

In the version shown in FIG. 3, drive shaft 28a is again operated by a motor 22a that is mounted upon the cover (not shown) of tank 12. Drive shaft 28a is operably connected to a turning shaft 34a of brush assembly 30a through a gearbox by interengaged gears 33a and 35a. As shown more specifically in FIG. 4, a driving gear 33a is axially connected to a lower end of drive shaft 28a; an interengaged driven gear 35a is similarly connected to an upper end of turning shaft 34a. The turning shaft and its supported gear 35a are disposed directly below PVC conduit 16.

Figure 3:
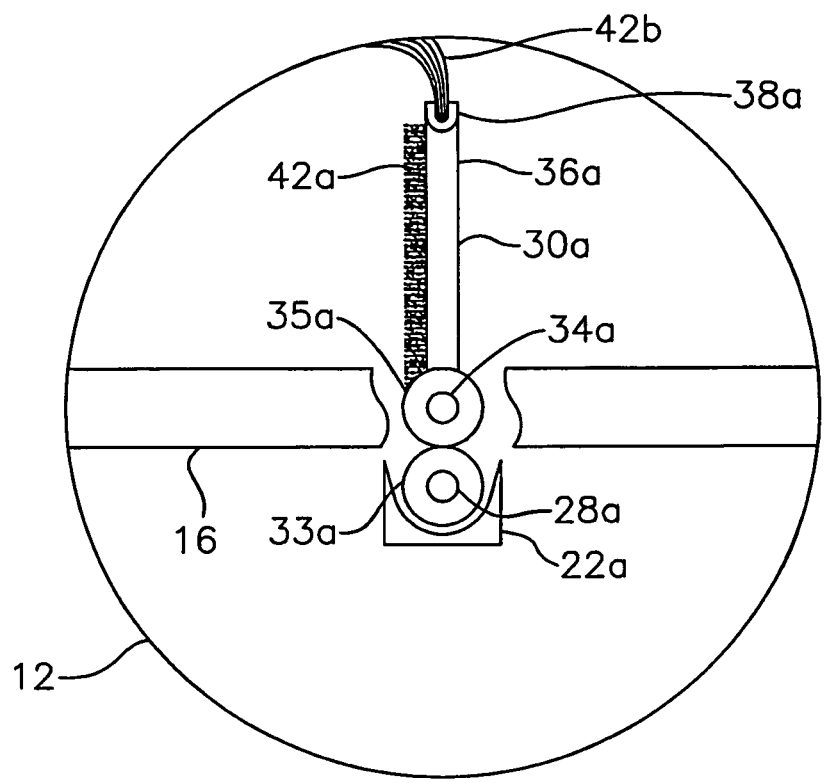
FIG. 3 is a top, partially cut away view of an alternative version of the tank cleaning apparatus wherein the drive shaft and scrubbing element turning shaft are operably interengaged through a gearbox.
Figure 4:
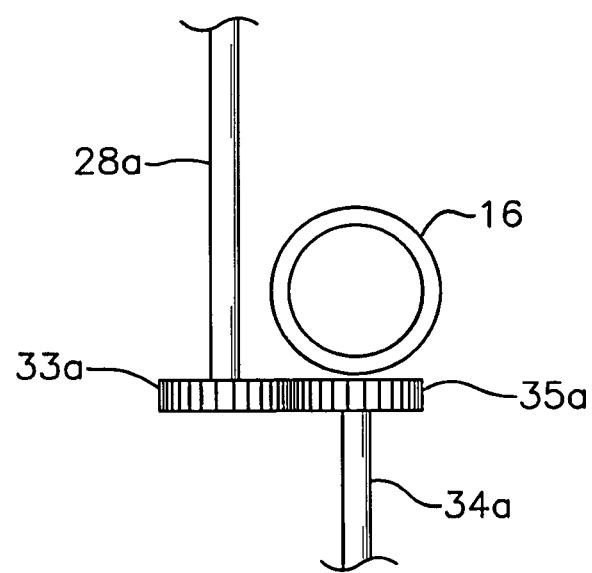
FIG. 4 is a side elevational view of the interengaging gears optionally used to operably interconnect the drive shaft and the brush turning shaft.

The embodiment disclosed in FIGS. 3 and 4 is otherwise constructed analogously to that of the previously described embodiment. In particular, a horizontal brush retention arm 36a is secured to a lower end of shaft 34a and extends radially outwardly therefrom. A vertical arm 38a is attached to a distal end of horizontal arm 36a and extends upwardly therefrom. Retention arms 36a and 38a carry respective brush segments 42a and 42b (or alternative scrubbing components) in the manner previously described.

In the second embodiment of this invention, the motor is again operated to axially rotate drive shaft 28a. The interengaging gears 33a and 35a of the gearbox are operated to rotate turning shaft 34a. This shaft axially rotates to drive assembly 30a around the interior of tank 12 in either a single direction or in a reciprocating fashion. Unlike the prior version, the turning shaft 34a rotates axially and does not revolve eccentrically about the center of the tank. As a result, retention arms 36a and 38a turn symmetrically about the tank. The brush segments 42a and 42b engage and scrub the bottom and side surfaces of the interior of the tank respectively.

Figure 5:
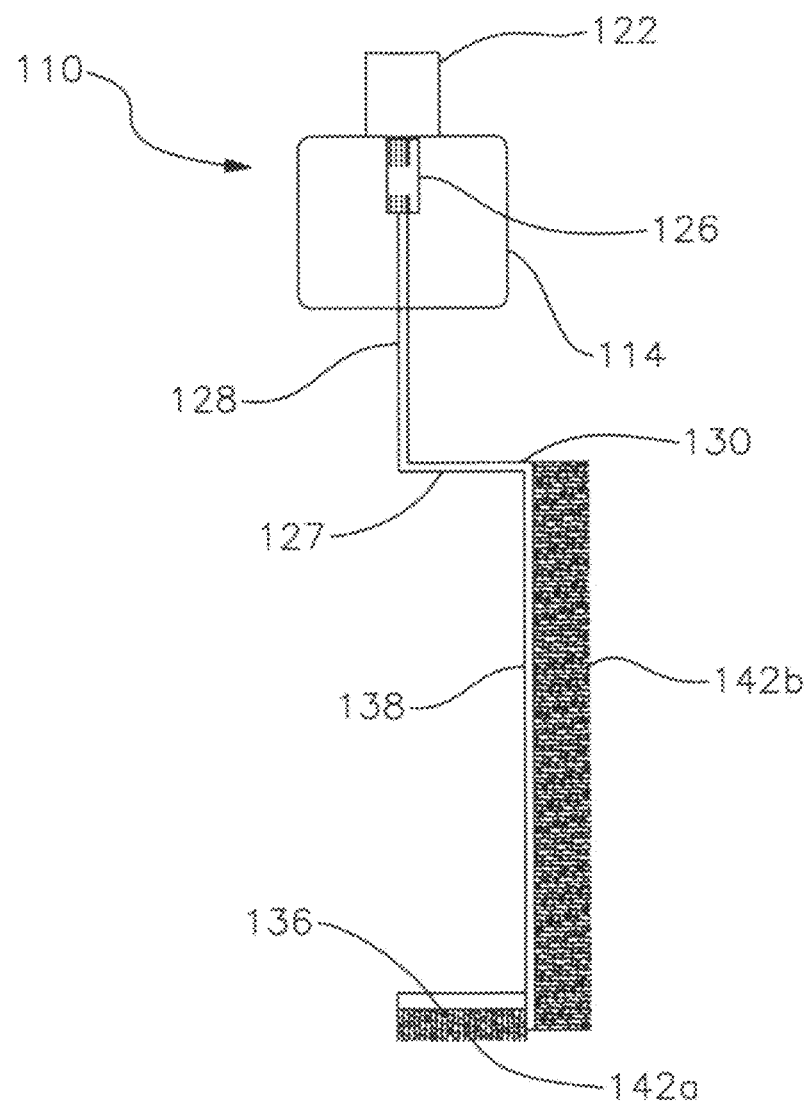
FIG. 5 is a side elevational of an alternative version of the storage tank cleaning machine used in storage tanks that do not employ a centrally mounted PVC conduit proximate an upper end of the tank.

FIG. 5 depicts still another embodiment of this invention wherein tank cleaning machine 110 is used for a tank (not shown) that does not include a centrally mounted PVC conduit proximate an upper end of the tank. In this version, a motor 122 is again mounted to a cover 114 of the tank. A central vertical channel is formed through the cover and the motor is operably connected through a spindle 126 with an axially rotatable drive shaft 128. A lower end of the drive shaft is joined to a scrubbing brush assembly 130. The brush assembly includes a horizontal connecting rod 127 that is fastened to and extends radially outwardly from drive shaft 128. A vertical brush retention arm 138 is joined to and extends downwardly from a distal end of rod 127. A horizontal retention arm 136 is joined to a lower end of vertical retention arm 138 and extends inwardly therefrom. Each of arms 136 and 138 carries a respective elongate brush segment 142a, 142b. As in the prior embodiment, the brush segments are securely mounted within respective grooves or tracks in the retention arms 136 and 138. As a result, brush segment 142a extends downwardly to engage a bottom surface of the tank interior and brush segment 142b extends radially outwardly to engage the inner surfaces of the cylindrical side wall of the tank.

In operation, motor 122 is operated to axially rotate shaft 128. This, in turn, drives assembly 130 such that brush segments 142a and 142b engage and scrub the bottom and side surfaces of the interior of the tank respectively. The motor can again have various sizes and capacities and be unidirectional or reciprocating to perform a desired cleaning operation. The connecting rod and the retention arms may have varying sizes and be formed separately from or unitarily with one another. Sponges, squeegees and alternative flexible scrubbing components may be substituted for the brushes.

In the version shown in FIG. 5, the horizontal connecting rod and brush configuration shown may be utilized due to the lack of a centrally mounted PVC conduit proximate the upper end of the storage tank. As drive shaft 128 is axially rotated, the connecting rod 37 turns through the tank without hindrance from an interior pipe or conduit. A smooth and uninterrupted cleaning operation is thereby achieved.

From the foregoing it may be seen that the apparatus of this invention provides for a machine for cleaning the interior of a water storage tank. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A machine for cleaning the interior surface of a generally cylindrical water storage tank, which tank has an upper access opening and a lid for removably covering the access opening, the storage tank further having a water-transmitting first conduit extending substantially horizontally across the cylindrical center of the storage tank and through a sidewall of the storage tank proximate an upper end thereof, a second conduit communicably connected said first conduit and extending substantially vertically downward through an interior of said tank such that said second conduit is non-concentric to said tank centerline and a lower distal end of said second conduit is spaced above a bottommost interior surface of said tank, and a float sensor mechanism mounted to said second conduit and interiorly within and spaced above the bottommost interior surface of the tank for controlling operation of a pump to selectively deliver water to the tank, said machine comprising:

a motor for mounting on the removable lid;

a drive shaft axially rotatably interconnected to said motor for extending through a vertical channel in said lid and being located axially offset from the water-transmitting first conduit to extend below the conduit without interference; and a substantially U-shaped scrubbing assembly operably attached to said drive shaft, said scrubbing assembly including a vertically oriented turning shaft that is operably interengaged with and axially offset from said drive shaft, said turning shaft being connected to said drive shaft such that said turning shaft is supported substantially parallel to said drive shaft and restricted from pivoting longitudinally relative said drive shaft, said scrubbing assembly further including a horizontal arm joined to said turning shaft proximate the bottommost interior surface of the tank and a lower end of said turning shaft and extending radially outwardly therefrom and a vertical arm joined to a distal portion of said horizontal arm and for extending vertically upward therefrom parallel to said turning shaft and proximate interior cylindrical side surface of the storage tank, the upper end of said vertical arm being located above the float sensor mechanism and above a lower end of the second conduit at least one of said horizontal and vertical arms carrying a flexible scrubbing component for engaging the interior surface of the storage tank; said motor being operated to axially rotate said drive shaft, whereby said turning arm of said scrubbing assembly is rotated through the interior of the water storage tank and said scrubbing component is drawn across and cleans the interior surface of the tank; said turning shaft and said vertical arm having an intermediate gap formed therebetween and above said horizontal arm, which gap is for providing operational clearance for the second conduit section and the float sensor mechanism and allowing said scrubbing assembly to rotate freely through the interior of the tank without engaging or interfering with the second conduit and the float sensor mechanism.

2. The machine of claim 1 in which said drive shaft is connected to said turning shaft by an off-centered coupler that is interconnected between said drive shaft and said turning shaft.

3. The machine of claim 1 in which said drive shaft and said turning shaft are operably interconnected by a pair of interengaging gears axially attached to said drive shaft and said turning shaft respectively.

4. The machine of claim 3 in which said turning shaft is substantially alignable with a center vertical axis of the generally cylindrical water storage tank.

5. The machine of claim 1 in which flexible scrubbing component includes a first part attached to and depending from said horizontal arm for engaging the interior bottommost surface of the tank and a second part carried by said vertical arm and extending laterally outwardly from said vertical arm for engaging an interior side surface of the tank.

6. A water storage tank and tank cleaner apparatus comprising:
a water storage tank having a generally cylindrical configuration and an upper access opening;
a water transmitting first conduit extending substantially horizontally across a cylindrical center axis of said storage tank and through a sidewall of said storage tank proximate an upper end thereof;
a second conduit interconnected to the sidewall of the tank proximate an upper end thereof and extending substantially vertically downward through an interior of said tank such that said second conduit is non-concentric to said tank centerline and a lower distal end of said second conduit is spaced above a bottommost interior surface of said tank;
a float sensor mechanism mounted interiorly within and spaced above said bottommost interior surface of said tank for controlling operation of a pump to selectively deliver water to said tank;
a lid for removably covering said access opening;
a motor for mounting on said lid;
a drive shaft axially rotatably interconnected to said motor for extending through a vertical channel in said lid and being located axially offset from said first conduit to extend below the conduit without interference; and
a substantially U-shaped scrubbing assembly operably attached to said drive shaft, said scrubbing assembly including a vertically oriented turning shaft that is operably interengaged with, axially offset from and substantially parallel to said drive shaft, a horizontal arm joined to said turning shaft proximate said bottommost interior surface of the tank and a lower end of said turning shaft and extending radially therefrom, a vertical arm joined to a distal portion of said horizontal arm and extending vertically upward therefrom parallel to said turning shaft and proximate interior cylindrical side surface of said storage tank, the upper end of said vertical arm being located above the float sensor mechanism and above a lower end of the second conduit and a flexible scrubbing component carried by at least one of said horizontal and vertical arms for engaging the interior surface of the tank, said motor being operated to axially rotate said drive shaft, whereby said turning arm is rotated through the interior of said water storage tank and said scrubbing component is drawn across and cleans said interior surface of said tank; said turning shaft and said vertical arm having an intermediate gap formed therebetween and above said horizontal arm, which gap provides operational clearance for said second conduit section and said float sensor mechanism and allows said assembly to rotate freely through the interior of the tank without engaging or interfering with said second conduit or said float sensor mechanism.

7. The apparatus of claim 6 in which said drive shaft is connected to said turning shaft by an off-centered coupler that is interconnected between said drive shaft and said turning shaft such that said drive shaft is spaced apart from said first conduit and said turning shaft is restricted from pivoting longitudinally relative to said drive shaft, said drive shaft extending vertically through said storage tank to a depth below said first conduit.

8. The apparatus of claim 6 in which said drive shaft and said turning shaft are operably connected by a pair of interengaging gears axially attached to said drive shaft and said turning shaft respectively such that said drive shaft is spaced apart from said first conduit, said drive shaft extending vertically through said storage tank to a depth below that of said first conduit.

9. The apparatus of claim 6 in which said scrubbing assembly includes a horizontal arm connected proximate a lower end of said turning shaft and a vertical arm attached proximate a distal end of said horizontal arm and extending vertically upwardly therefrom, said horizontal and vertical arms carrying respective parts of said scrubbing component for engaging the bottommost and side interior surfaces of said tank respectively.

10. The apparatus of claim 6 in which said flexible scrubbing component including a first part attached to and depending from said horizontal arm for engaging said interior bottommost surface of the tank and a second part carried by said vertical arm and extending laterally outwardly from said vertical arm for engaging an interior side surface of the tank.

11. The apparatus of claim 10 in which said lower distal end of said second conduit is spaced sufficiently above said bottommost interior surface of said tank such that said horizontal arm and said attached first part of said scrubbing component pass freely beneath said second conduit and said float sensor mechanism and do not engage or interfere with said second conduit or said float sensor mechanism when said scrubbing assembly is turned through said interior of said storage tank.

12. The apparatus of claim 6 in which said flexible scrubbing component includes a brush.

13. The apparatus of claim 6 in which each of said horizontal and vertical arms includes a longitudinal track for securing an inner end of said scrubbing component therein.

14. The apparatus of claim 6 wherein said motor is a reciprocating motor that is operated to draw said scrubbing component in alternating directions across the interior surface of the tank.

15. The apparatus of claim 6 further including a timer programmed to activate and deactivate said motor at selected times.

16. A water storage tank and tank cleaner apparatus comprising:
- a water storage tank having a generally cylindrical configuration and an upper access opening;
- a first conduit extending substantially horizontally across the cylindrical center of the storage tank and through a sidewall of said storage tank proximate an upper end thereof;
- a second conduit communicably connected to said first conduit and extending substantially vertically downward through an interior of said storage tank such that said second conduit is non-concentric to said tank centerline and a lower distal end of said second conduit is spaced above a bottommost interior surface of said storage tank, said second conduit being spaced apart from an interior cylindrical side surface of said tank;
- a float sensor mechanism mounted interiorly within said tank and spaced above said bottommost interior surface of said tank for controlling operation of a pump to selectively deliver water to said tank;
- a lid for removably covering said access opening;
- a motor for mounting on said lid;
- a drive shaft axially interconnected to said motor for extending through a vertical channel in said lid located axially offset from the first conduit to extend below the conduit without interference; and
- a substantially U-shaped scrubbing assembly operably attached to said drive shaft, said scrubbing assembly including a vertically oriented turning shaft that is operably interengaged with said drive shaft, a horizontal arm joined to said turning shaft proximate the bottommost interior surface of the tank and a lower end of said turning shaft and extending radially therefrom, a vertical arm joined to a distal portion of said horizontal arm and extending vertically upward therefrom parallel to said turning shaft and proximate interior cylindrical side surface of said storage tank, the upper end of said vertical arm being located above the float sensor mechanism and above a lower end of the second conduit and a flexible scrubbing component carried by at least one of said horizontal and vertical arms for engaging the interior surface of said tank, said motor being operated to axially rotate said drive shaft, whereby said turning shaft is rotated through the interior of said water storage tank and said scrubbing component is drawn across and cleans said interior surface of said tank, said turning shaft and said vertical arm having an intermediate gap formed therebetween, which intermediate gap provides operational clearance for said second conduit section and said float sensor mechanism and allows said scrubbing assembly to rotate freely through the interior of said storage tank without engaging or interfering with said second conduit and said float sensor mechanism.

17. The apparatus of claim 16 in which said lower distal end of said second conduit is spaced sufficiently above said bottommost interior surface of said tank such that said horizontal arm passes freely beneath said second conduit and said float sensor mechanism and does not engage or interfere with said second conduit or said float sensor mechanism when said scrubbing assembly is turned through said interior of said storage tank.

18. The apparatus of claim 16 in which said drive shaft and said turning shaft are operably interconnected by a pair of interengaging gears axially attached to said drive shaft and said turning shaft respectively.

* * * * *